(12) United States Patent
Horng et al.

(10) Patent No.: US 7,271,518 B2
(45) Date of Patent: *Sep. 18, 2007

(54) BALANCING STRUCTURE FOR MOTOR

(75) Inventors: Alex Horng, Kaohsiung (TW); Yin-Rong Hong, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 76 days.

This patent is subject to a terminal disclaimer.

(21) Appl. No.: 11/158,010

(22) Filed: Jun. 22, 2005

(65) Prior Publication Data

US 2006/0232150 A1 Oct. 19, 2006

(30) Foreign Application Priority Data

Apr. 18, 2005 (TW) ............................... 94112319 A

(51) Int. Cl.
*H02K 7/04* (2006.01)
(52) U.S. Cl. ..................... 310/190; 310/51; 310/67 R
(58) Field of Classification Search ................. 310/51, 310/68 B, 168, 190, 191, 67 R, 216, 254
See application file for complete search history.

(56) References Cited

U.S. PATENT DOCUMENTS

| | | | | |
|---|---|---|---|---|
| 4,820,951 A | * | 4/1989 | Sugiura et al. | ............. 310/257 |
| 5,668,450 A | * | 9/1997 | Glasier et al. | ............. 318/254 |
| 5,679,997 A | * | 10/1997 | Matsuzawa et al. | ........ 310/254 |
| 5,808,390 A | * | 9/1998 | Miyazawa et al. | .......... 310/194 |
| 5,959,377 A | * | 9/1999 | Horng | .................. 310/40 MM |
| 6,050,785 A | * | 4/2000 | Horng | ......................... 417/354 |
| 6,097,120 A | | 8/2000 | Horng | |
| 6,483,209 B1 | | 11/2002 | Horng et al. | |
| 6,700,241 B1 | | 3/2004 | Horng et al. | |
| 6,727,626 B2 | * | 4/2004 | Horng et al. | ............... 310/190 |
| 2005/0006962 A1 | | 1/2005 | Horng | |

FOREIGN PATENT DOCUMENTS

| | | | | |
|---|---|---|---|---|
| JP | 2-214455 | * | 8/1990 | ................ 310/269 |
| TW | 383818 | | 3/2000 | |
| TW | 422365 | | 2/2001 | |
| TW | 428838 | | 4/2001 | |

* cited by examiner

*Primary Examiner*—Tran Nguyen
(74) *Attorney, Agent, or Firm*—Bacon & Thomas, PLLC

(57) ABSTRACT

A motor includes a fixed portion, a rotor, and at least one balancing plate fixed on the fixed portion. The fixed portion includes a stator having a plurality of pole plates that extend to form a plurality of pole faces, with a gap being defined between a pair of the pole faces adjacent to each other. The rotor includes a shaft and an annular magnet facing the pole faces. The balancing plate includes at least two magnetically conductive faces respectively aligned with the pole faces. The magnetically conductive faces are spaced from each other by a space for mounting a sensor. The magnetically conductive faces face at least one face of the annular magnet. When the rotor turns, the annular magnet of the rotor induces the alternating magnetic fields created by the stator and attracts the magnetically conductive faces to thereby maintain rotational balance of the rotor.

15 Claims, 6 Drawing Sheets

BALANCING STRUCTURE FOR MOTOR

BACKGROUND OF THE INVENTION

1. Field of the Invention

The present invention relates to a balancing structure for a motor. In particular, the present invention relates to a balancing structure for maintaining stable rotation of a rotor of a motor.

2. Description of Related Art

A wide variety of structures for maintaining rotational balance for a rotor of a motor have been proposed. One of these structures comprises a fixed portion, a rotor, an attracting portion, and a magnetically conductive portion. The fixed portion includes a base, an axial tube fixed on the base, a bearing received in the axial tube, a stator, and a circuit board. The stator includes a coil with axial winding or radial winding and a plurality of pole plates (or pole arms). The rotor includes a shaft rotatably extending through the bearing and an annular magnet surrounding the pole faces of the pole plates. The attracting portion is provided on a bottom of the rotor or a top end of the axial tube. Alternatively, the attracting portion is provided by the annular magnet or the alternating magnetic fields created by the pole plates of the stator. The magnetically conductive portion is made of a magnetically conductive material and may be comprised of a disc with two arcuate edges, a casing fixed in a rotor housing of the rotor, an annular plate, a plurality of arcuate plates, or a rotor housing of a spindle motor. The magnetically conductive portion may be provided on the circuit board, an inner periphery of the rotor, or the bottom of the rotor, and associated with the attracting portion. Such a structure is disclosed in, e.g., Taiwan Utility Model Publication Nos. 383818, 422365, and 428838, U.S. Pat. Nos. 6,097,120; 6,483,209; 6,700,241; and 6,727,626, and U.S. Patent Publication No. 2005/0006962.

When the motor turns, alternating magnetic fields are created by the pole faces of the magnetic pole plates (or pole arms). The magnetically conductive portion is attracted by the attracting portion during rotation of the rotor, thereby maintaining rotational balance of the rotor, avoiding disengagement of the rotor shaft from the stator, reducing rotational friction of the bearing, and prolonging the life of the motor.

It is common to make the size of the metal plate consisting of the magnetically conductive portion as large as possible so as to provide a large area facing the magnet of the attracting portion (such as the annular magnet). This may result in excessive attracting force between the magnetically conductive portion and the attracting portion for balancing the rotor. In a case that the attracting portion is provided by the annular magnet and the magnetically conductive portion is provided on the fixed portion, the magnetically conductive portion often extends across the gap between a pair of the pole faces of the stator or across the gap and the associated pole faces in an asymmetric manner. Sufficient space could not be obtained in the gap for mounting at least one Hall element. Further, uneven alternating magnetic fields are created and thus cause deterioration in the rotational efficiency of the rotor. In a case that at least one notch is provided in the magnetically conductive portion for mounting a Hall element, the manufacturing processing becomes more complicated and uniform balancing effect could not be obtained.

OBJECTS OF THE INVENTION

An object of the present invention is to provide a balancing structure for allowing easy assembly while maintaining rotational balance for a rotor of a motor.

Another object of the present invention is to provide a balancing structure for preserving a space for mounting a sensor while maintaining rotational balance for a rotor of a motor and allowing easy assembly.

SUMMARY OF THE INVENTION

A motor in accordance with the present invention includes a fixed portion, a rotor, and at least one balancing plate. The fixed portion includes a stator having at least one winding and a plurality of pole plates that extend to form a plurality of pole faces, with a gap being defined between a pair of the pole faces adjacent to each other. The at least one winding is energizable to make the pole faces create alternating magnetic fields.

The rotor includes a shaft and an annular magnet. The shaft rotatably extends through the fixed portion, and the annular magnet is mounted to an inner periphery of the rotor and face the pole faces of the stator.

The at least one balancing plate is mounted on the fixed portion. The at least one balancing plate includes at least two magnetically conductive faces that are respectively aligned with the pole faces of the stator. The at least two magnetically conductive faces are spaced from each other by a space that is aligned with an associated one of the gaps of the stator. Further, the at least two magnetically conductive faces face at least one face of the annular magnet.

When the rotor turns, the annular magnet of the rotor induces the alternating magnetic fields created by the stator and attracts the at least two magnetically conductive faces to thereby maintain rotational balance of the rotor.

Preferably, at least one sensor is mounted on the fixed portion and located in at least one of the gaps of the stator.

Preferably, the fixed portion further comprises a circuit board on which the at least one sensor is mounted.

Preferably, the at least one balancing plate is in intimate contact with an underside or a top side of the circuit board.

Preferably, the space between a pair of the at least two magnetically conductive faces is equal to or smaller than a length of each gap of the stator.

Preferably, at least one end of each magnetically conductive face is aligned with at least one end of an associated one of the pole faces.

Preferably, the fixed portion comprises an axial tube, and the at least one magnetically conductive plate is a disc having a central hole and mounted around the axial tube of the fixed portion.

In an embodiment of the invention, the at least two magnetically conductive faces extend from a circumference of the disc and face the inner periphery of the annular magnet. Preferably, the balancing plate comprises a plurality of notches respectively aligned with the gaps of the stator and a plurality of extensions respectively aligned with the pole faces of the pole faces of the stator. Preferably, each magnetically conductive face is formed on an upper face of a distal end of an associated one of the extensions of the balancing plate, and the magnetically conductive faces face a bottom face of the annular magnet.

In another embodiment, at least two arcuate balancing plates are provided. Each arcuate balancing plate has an upper face. The magnetically conductive faces are located on the upper faces of the balancing plates and face a bottom side of the annular magnet of the rotor.

The stator may include radial winding or axial winding.

Other objects, advantages and novel features of this invention will become more apparent from the following detailed description when taken in conjunction with the accompanying drawings.

DETAILED DESCRIPTION OF THE PREFERRED EMBODIMENTS

Figure 1:
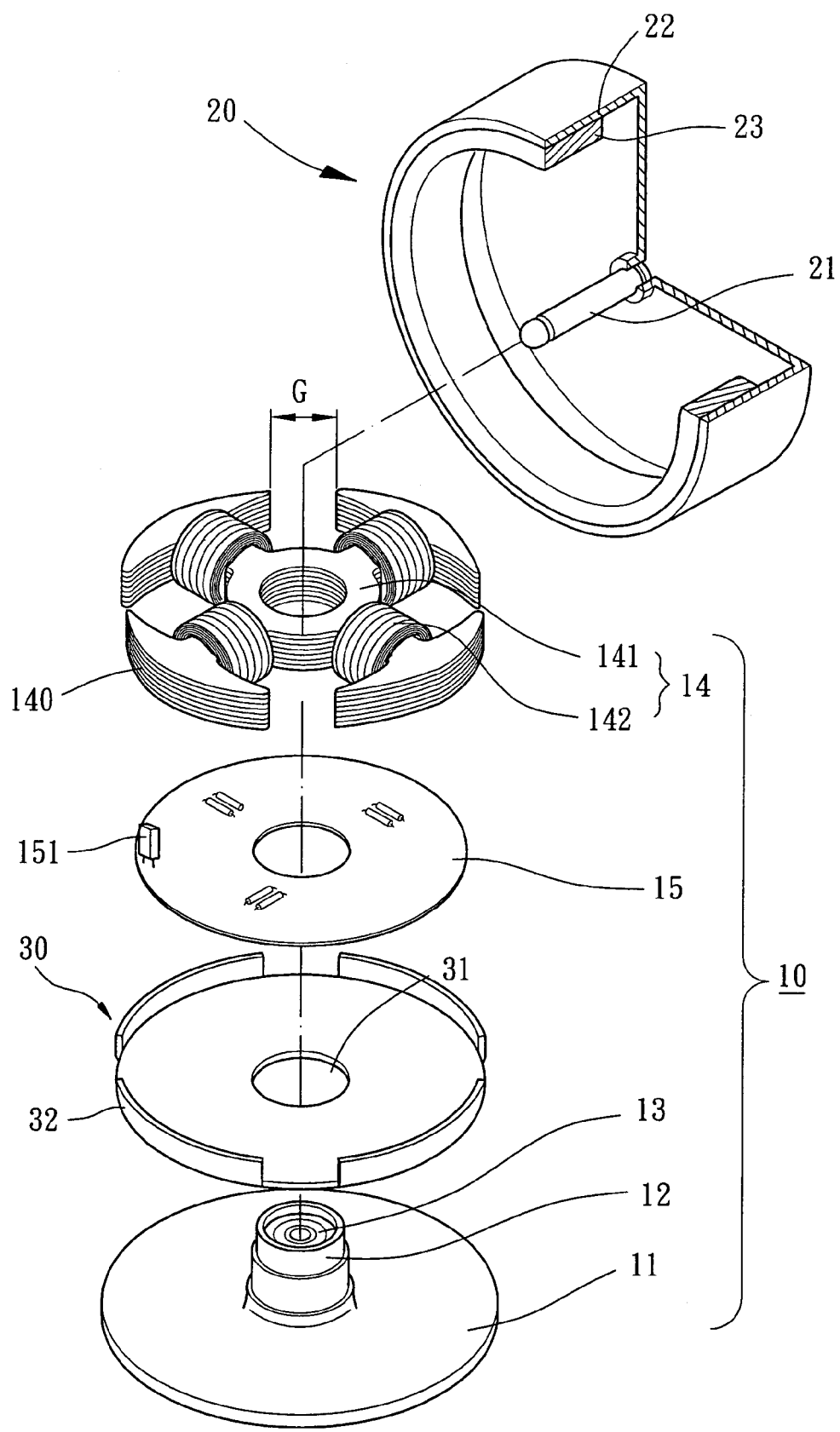
FIG. 1 is an exploded perspective view of a first embodiment of a motor in accordance with the present invention.

Referring to FIG. 1, a first embodiment of a motor in accordance with the present invention comprises a fixed portion 10, a rotor 20, and a balancing plate 30. The motor can be used as a motor for a heat-dissipating fan, a spindle motor for an optical disk drive, etc.

Figure 2:
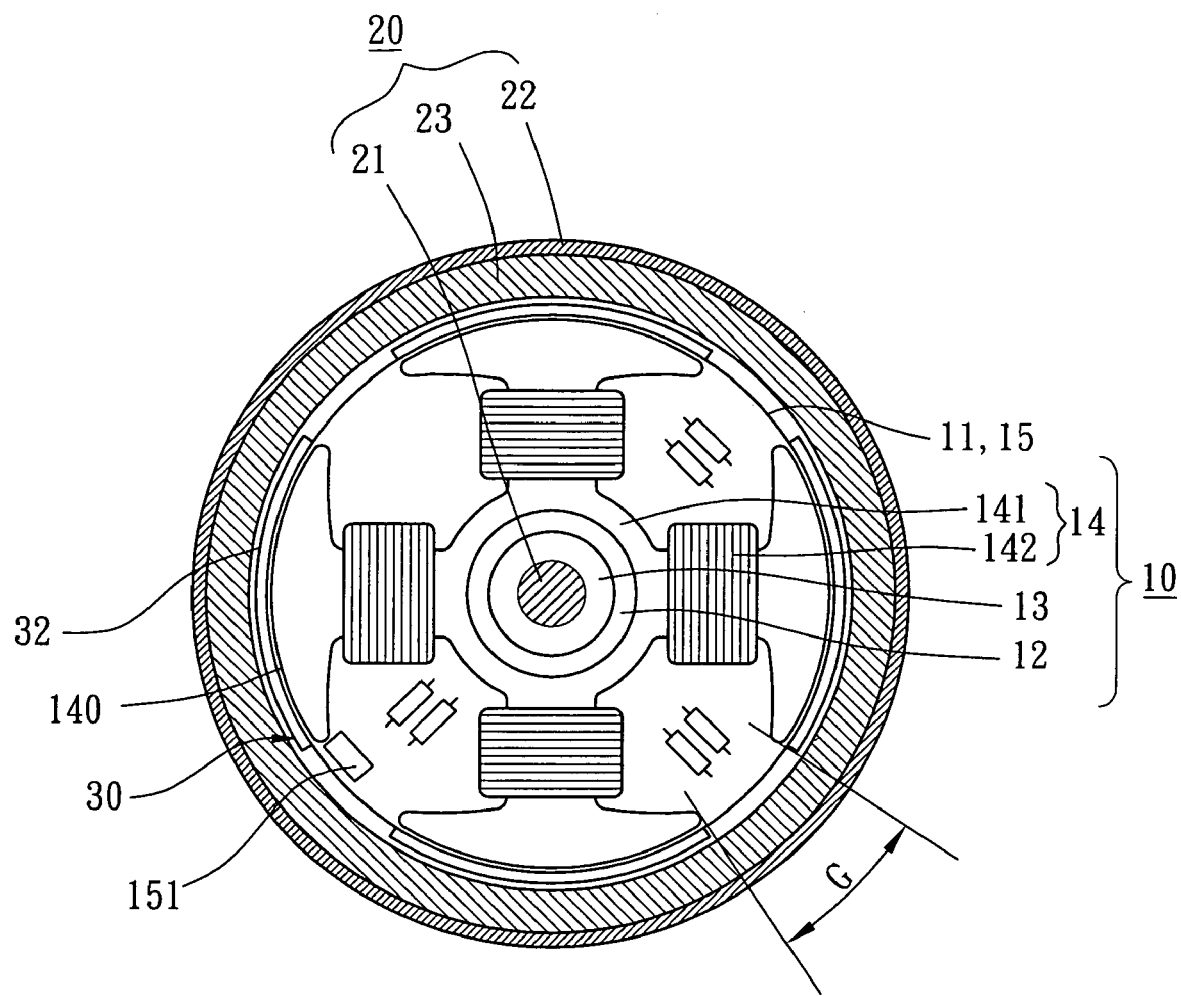
FIG. 2 is a sectional view of the motor in FIG. 1.

Referring to FIGS. 1 and 2, the fixed portion 10 includes a base 11, an axial tube 12, a bearing 13, a stator 14, and a circuit board 15. The base 11 may be coupled to a casing (not shown) of the motor. The axial tube 12 is fixed on or integrally formed with the base 11. At least one bearing 13 is mounted in the axial tube 12 whereas as the stator 14 and the circuit board 15 are mounted around the axial tube 12. The bearing 13 may be an oily bearing, ball bearing, fluid dynamic bearing, or magnetic bearing.

The stator 14 may be a stator with radial winding. The stator 14 includes at least one pole plate 141 with a winding 142. In the illustrated embodiment, the stator 14 includes four pole plates 141 each having a winding 142 wound therearound along a radial direction. The pole plates 141 extend radially to form a plurality of pole faces 140, with a gap G being defined between two mutually facing ends respectively of a pair of pole faces 140 adjacent to each other.

At least one sensor 151 (such as a Hall element) is mounted on the circuit board 15 and located in an associated one of the gaps G of the stator 14. The sensor 151 detects the rotational status of the rotor 20, and the direction of the electric current of the windings 142 on the pole plates 141 are alternately controlled by the control circuit of the circuit board 15 such that alternating magnetic fields are created by the pole faces 140 of the pole plates 141.

Still referring to FIGS. 1 and 2, the rotor 20 includes a shaft 21, a housing 22, and an annular magnet 23. An end of the shaft 21 is fixed to a center of an end wall of the housing 22, with the other end of the shaft 21 rotatably extending through the bearing 13. The annular magnet 23 is mounted to an inner periphery of the housing 22. The annular magnet 23 includes a plurality of alternately disposed north pole sections (not shown) and south pole sections (not shown) on an inner periphery thereof, with the pole faces 140 of the stator 14 facing the north and south pole sections. Thus, the annular magnet 23 induces the alternate energizing of the pole faces 140 to drive the rotor 20 to turn.

Still referring to FIGS. 1 and 2, the balancing plate 30 is substantially a disc made of a magnetically conductive material such as iron. The balancing plate 30 includes a central hole 31 and at least two magnetically conductive faces 32 (four in this embodiment) extending upward (or downward) from a circumference of the balancing plate 30. The balancing plate 30 is mounted around the axial tube 12 through provision of the central hole 31. The balancing plate 30 is in intimate contact with an underside or a top side of the circuit board 15.

In assembly, the magnetically conductive faces 32 are preferably respectively aligned with the pole faces 140 of the stator 14, with a space between a pair of the magnetically conductive faces 32 of the balancing plate 30 being aligned with an associated gap G between a pair of the pole faces 140 adjacent to each other. Preferably, at least one end of each magnetically conductive face 32 is aligned with at least one end of an associated pole face 140. Further, the magnetically conductive faces 32 face the inner periphery of the annular magnet 23 of the rotor 20. Preferably, the space between a pair of the magnetically conductive faces 32 of the balancing plate 30 is equal to or smaller than a length of the associated gap G between a pair of the pole faces 140 adjacent to each other. Preferably, each magnetically conductive face 32 extends neither across nor into the associated gap G.

Still referring to FIG. 2, after assembly, the magnetically conductive faces 32 of the balancing plate 30 are fixed on the fixed portion 10 and respectively aligned with the pole faces 140 of the stator 14 while facing the inner periphery of the annular magnet 23 of the rotor 20. By this arrangement, over-occupation by the magnetically conductive faces 32 is avoided, and a space sufficient for mounting, e.g., the sensor 151 or other element is preserved in each gap G. Further, since each magnetically conductive face 32 directly faces the associated pole face 140 and since the magnetically conductive faces 32 and the pole faces 140 are arranged symmetrically, assembling precision of the balancing plate 30 can be precisely controlled while providing uniform alternate energizing and symmetric magnetic balancing effect. Shaking, vibration, or wobbling of rotor 20 is avoided while the pole sections of the rotor 20 are passing through the pole faces 140. The rotational balance and the rotational stability of the rotor 20 are maintained.

Figure 3:
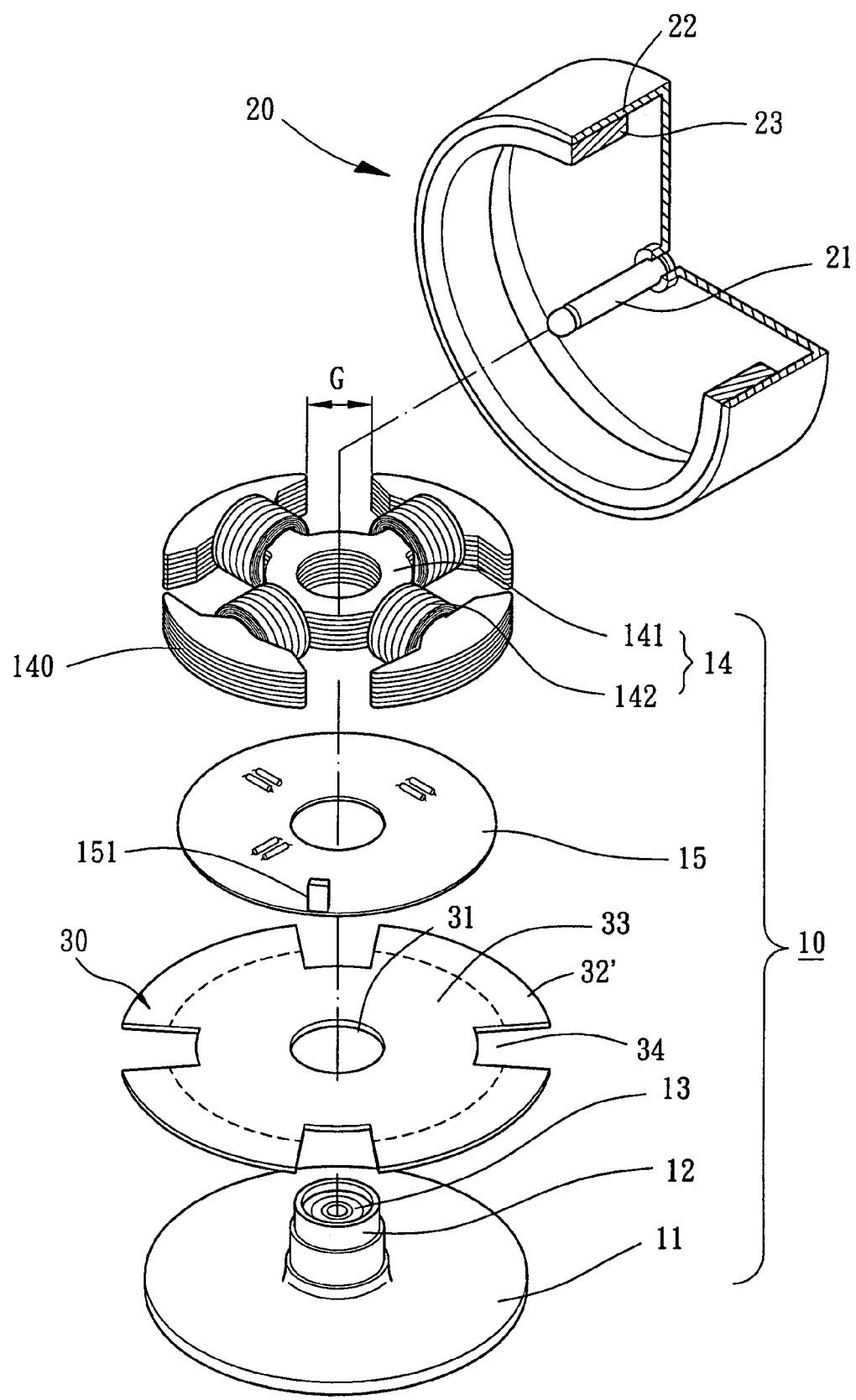
FIG. 3 is an exploded perspective view of a second embodiment of the motor in accordance with the present invention.
Figure 4:
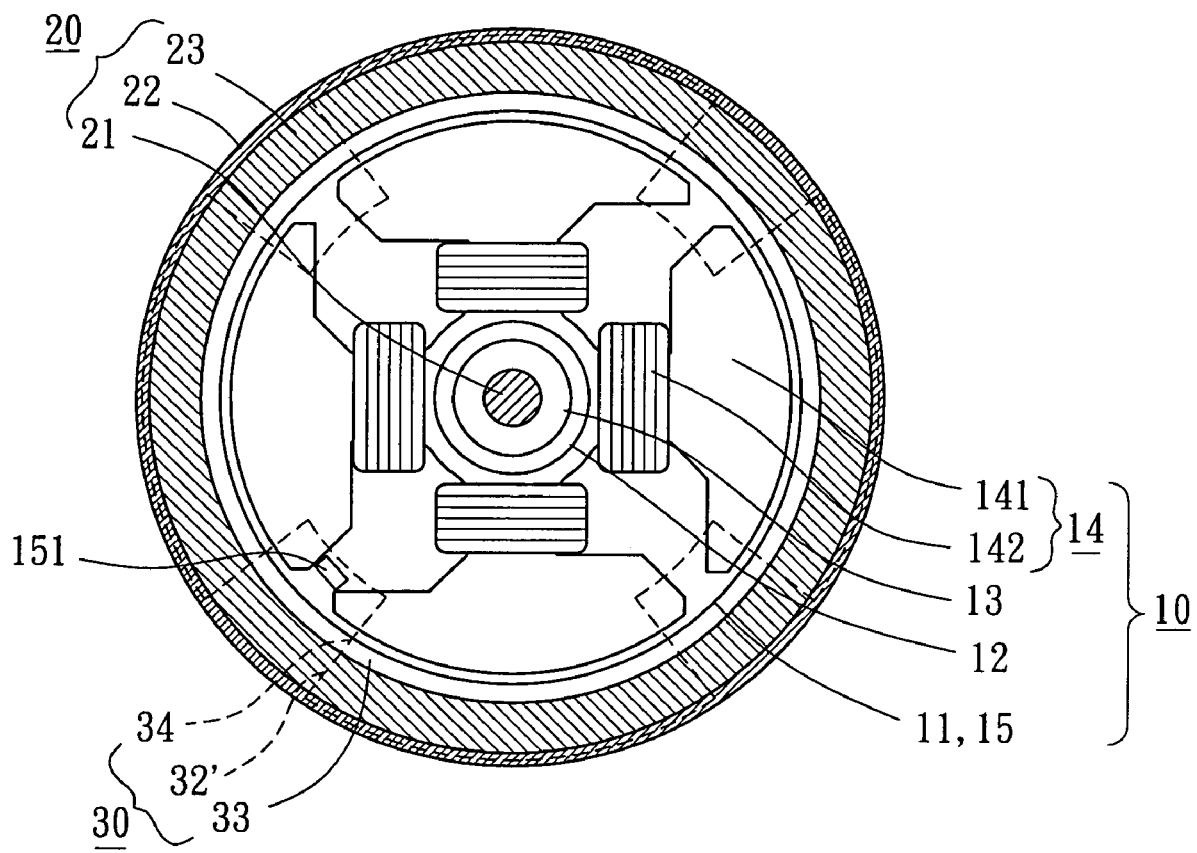
FIG. 4 is a sectional view of the motor in FIG. 3.

FIGS. 3 and 4 illustrate a second embodiment of the invention. In this embodiment, the balancing plate 30 includes a plurality of extensions 33 respectively aligned with the pole faces 140 of the stator 14. Further, the balancing plate 30 includes a plurality of notches 34 respectively aligned with the gaps G of the stator 14. Each extension 33 has a magnetically conductive face 32' formed on an upper face of a distal end thereof and aligned with the associated pole face 140. The space (i.e., the notch 34) between a pair of the magnetically conductive faces 32' adjacent to each other is aligned with an associated gap G between a pair of the pole faces 140 adjacent to each other. The balancing plate 30 is in intimate contact with an underside or a top side of the circuit board 15.

In assembly, each magnetically conductive face 32' faces a bottom face of the annular magnet 23. Each magnetically conductive face 32' extends neither across nor into the associated gap G. Thus, at least one of the notches 34 provides a sufficient space for mounting the sensor 151 or other elements of the circuit board 15 so that the sensor 151 or other elements can be located in the associated gap G.

Further, since each magnetically conductive face 32' is directly aligned with the associated pole face 140 and since the magnetically conductive faces 32' and the pole faces 140 are arranged symmetrically, assembling precision of the balancing plate 30 relative to the stator 14 can be precisely controlled while providing uniform alternate energizing and symmetric magnetic balancing effect. Shaking, vibration, or wobbling of rotor 20 is avoided while the pole sections of the rotor 20 are passing through the pole faces 140. The rotational balance and the rotational stability of the rotor 20 are maintained.

Figure 5:
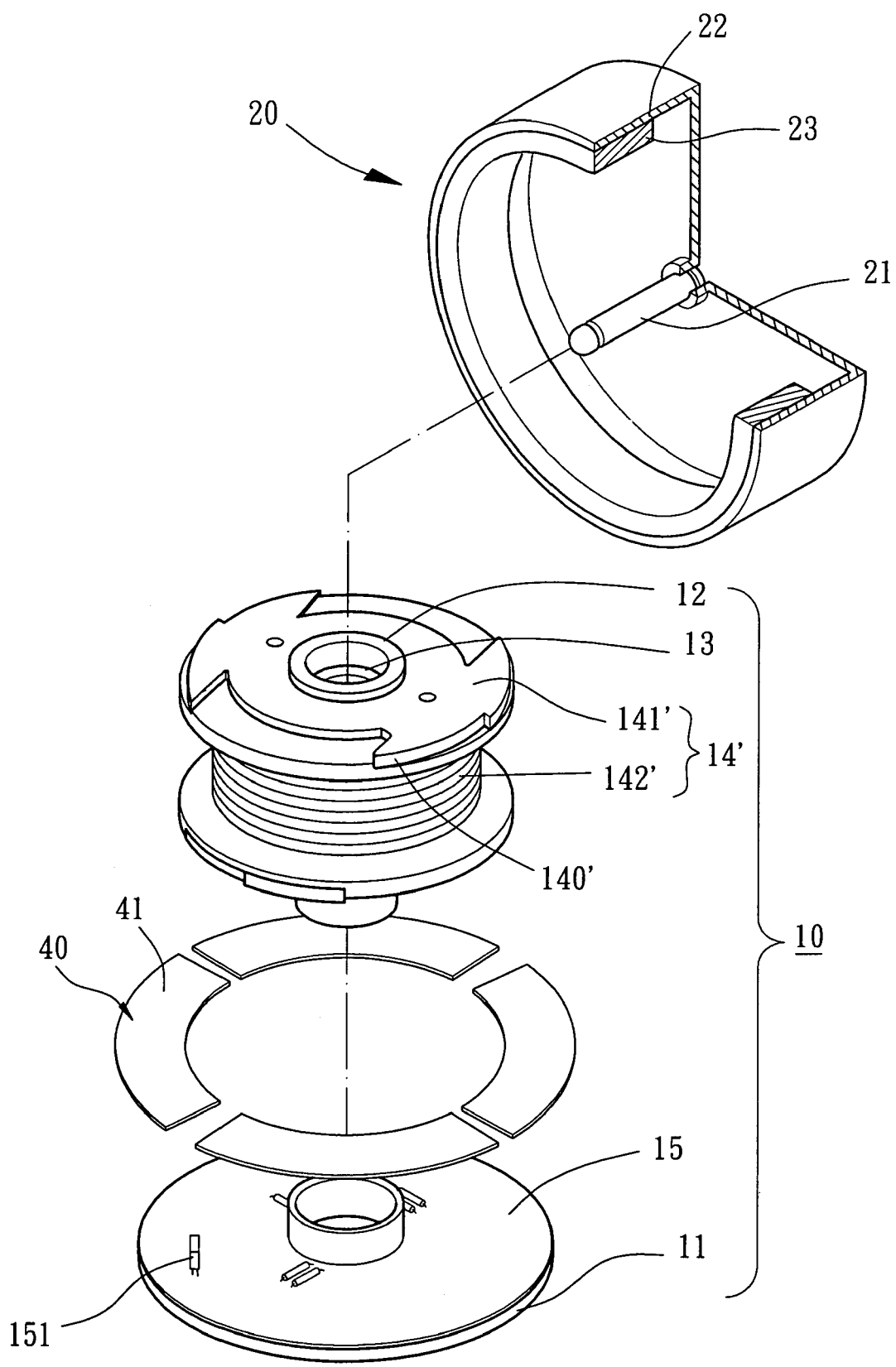
FIG. 5 is an exploded perspective view of a third embodiment of the motor in accordance with the present invention.
Figure 6:
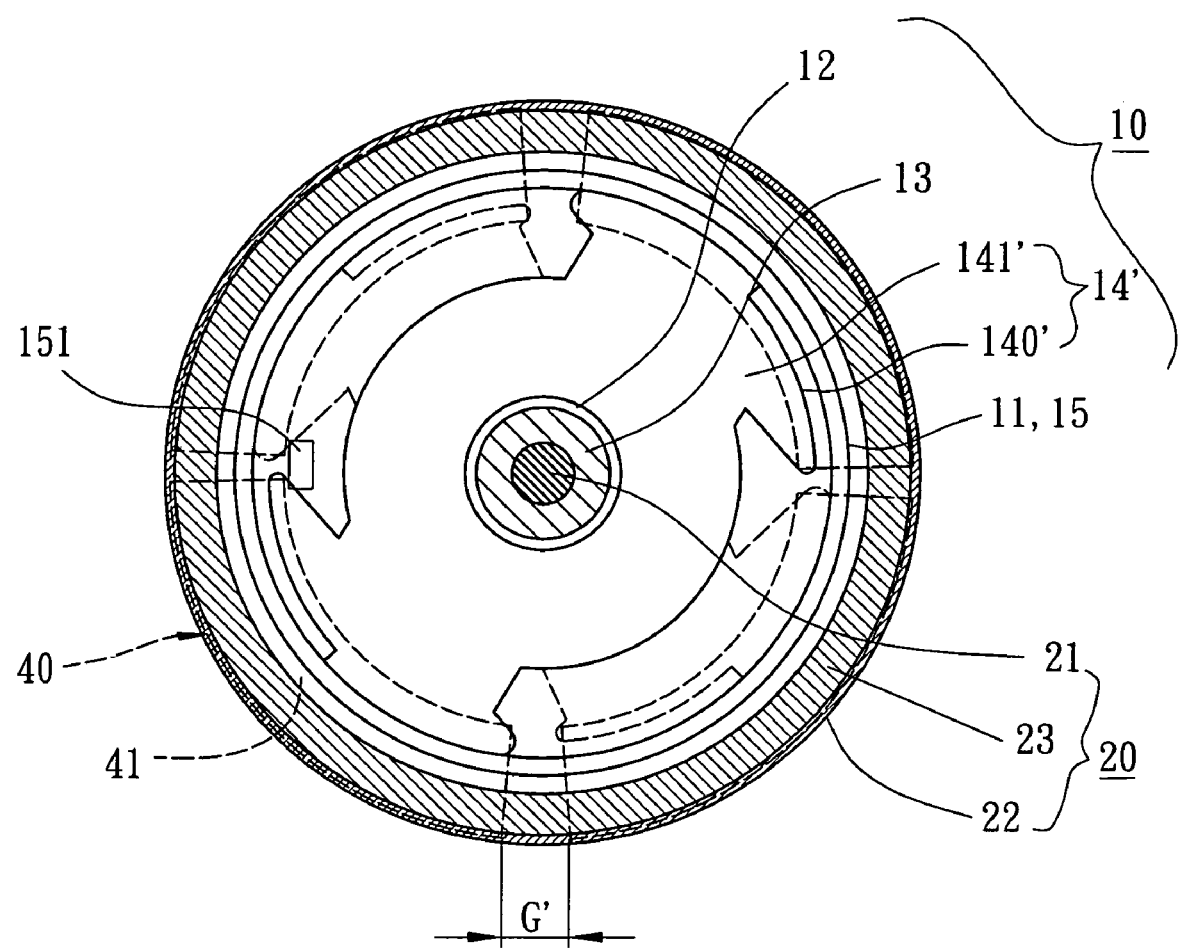
FIG. 6 is a sectional view of the motor in FIG. 5.

FIGS. 5 and 6 illustrate a third embodiment of the invention, wherein the balancing plate 30 is replaced with at least two (four in this embodiment) smaller balancing plates 40. Each balancing plate 40 is an arcuate metal plate having an upper magnetically conductive face 41. The fixed portion 10 includes a stator 14' with an axial winding. In particular, the stator 14' includes a plurality of pole plates 141' and a winding 142' axially wound between the pole plates 141', with each pole plate 141' extending radially to form a plurality of pole faces 140' and with a gap G' defined between the pole faces 140'.

In assembly, the balancing plates 40 are fixed on the base 11 or the circuit board 15 of the fixed portion 10. Further, each balancing plate 40 is aligned with an associated pole face 140' of the stator 14'. A space between a pair of the magnetically conductive faces 41 adjacent to each other is aligned with an associated gap G' between a pair of the pole faces 140' adjacent to each other. Preferably, at least one end of each magnetically conductive face 41 is aligned with at least one end of the associated pole face 140'. Further, the magnetically conductive faces 41 face a bottom face of the annular magnet 23.

The space between a pair of the magnetically conductive faces 41 adjacent to each other is preferably equal to or smaller than a length of the gap G' between a pair of the pole faces 140' adjacent to each other. Each magnetically conductive face 41 extends neither across nor extend into the associated gap G'. Thus, the space between a pair of the magnetically conductive faces 41 adjacent to each other provides a sufficient space for mounting the sensor 151 or other elements of the circuit board 15 so that the sensor 151 or other elements can be located in the associated gap G'. Further, since each magnetically conductive face 41 is directly aligned with the associated pole face 140' and since the magnetically conductive faces 41 and the pole faces 140' are arranged symmetrically, assembling precision of the balancing plate 40 relative to the stator 14' can be precisely controlled while providing uniform alternate energizing and symmetric magnetic balancing effect. Shaking, vibration, or wobbling of rotor 20 is avoided while the pole sections of the rotor 20 are passing through the pole faces 140. The rotational balance and the rotational stability of the rotor 20 are maintained.

While the principles of this invention have been disclosed in connection with specific embodiments, it should be understood by those skilled in the art that these descriptions are not intended to limit the scope of the invention, and that any modification and variation without departing the spirit of the invention is intended to be covered by the scope of this invention defined only by the appended claims.

What is claimed is:

1. A motor comprising:
    a fixed portion including a stator, the stator including at least one winding and a plurality of pole plates that extend to form a plurality of pole faces, with a gap being defined between a pair of the pole faces adjacent to each other, said at least one winding being energizable to make said pole faces create alternating magnetic fields;
    a rotor including a shaft and an annular magnet, the shaft rotatably extending in a longitudinal direction through the fixed portion, the annular magnet being mounted to an inner periphery of the rotor and facing said pole faces of the stator; and
    at least one magnetically conductive balancing plate mounted on the fixed portion, said at least one magnetically conductive balancing plate including at least two magnetically conductive faces that are respectively aligned with the pole faces of the stator, said at least two magnetically conductive faces being spaced from each other by a space that is aligned with an associated one of the gaps of the stator, said at least two magnetically conductive faces facing at least one face of the annular magnet and extending from an outer periphery of said balancing plate in the longitudinal direction;
    wherein when the rotor turns, the annular magnet of the rotor induces the alternating magnetic fields created by the stator and attracts said at least two magnetically conductive faces to thereby maintain rotational balance of the rotor.

2. The motor as claimed in claim 1, wherein the fixed portion further comprises at least one sensor mounted thereon and located in at least one of the gaps of the stator.

3. The motor as claimed in claim 2, wherein the fixed portion further comprises a circuit board on which said at least one sensor is mounted.

4. The motor as claimed in claim 3, the circuit board comprises an underside, and wherein said at least one balancing plate is in intimate contact with the underside of the circuit board.

5. The motor as claimed in claim 3, wherein the circuit board comprises a top side, and wherein said at least one balancing plate is in intimate contact with the top side of the circuit board.

6. The motor as claimed in claim 1, wherein the space between a pair of the at least two magnetically conductive faces is equal to a length of each said gap of the stator.

7. The motor as claimed in claim 1, wherein the space between a pair of the at least two magnetically conductive faces is smaller than a length of each said gap of the stator.

8. The motor as claimed in claim 1, wherein at least one end of each said magnetically conductive face is aligned with at least one end of an associated one of the pole faces.

9. The motor as claimed in claim 1, wherein the fixed portion comprises an axial tube, and wherein said at least one magnetically conductive plate is a disc having a central hole and mounted around the axial tube of the fixed portion.

10. The motor as claimed in claim 9, wherein the at least two magnetically conductive faces extend from a circumference of the disc and face the inner periphery of the annular magnet.

11. The motor as claimed in claim 9, wherein said at least one balancing plate comprises a plurality of notches respectively aligned with the gaps of the stator and a plurality of extensions respectively aligned with the pole faces of the pole faces of the stator.

12. The motor as claimed in claim 11, wherein each said magnetically conductive face is formed on an upper face of a distal end of an associated one of the extensions of said at least one balancing plate, and wherein said at least two magnetically conductive faces face a bottom face of the annular magnet.

13. The motor as claimed in claim 1, wherein the number of said at least one balancing plate is at least two, said at least two balancing plates being arcuate and each having an upper face, said at least two magnetically conductive faces being respectively located on the upper faces of said at least two balancing plates and facing a bottom side of the annular magnet of the rotor.

14. The motor as claimed in claim 1, wherein the stator includes one of radial winding and axial winding.

15. The motor as claimed in claim 1, wherein said magnetically conductive face is bent and extended from the outer periphery of said balancing plate.

* * * * *